US010527206B2

(12) United States Patent
Cittadini Bellini et al.

(10) Patent No.: US 10,527,206 B2
(45) Date of Patent: Jan. 7, 2020

(54) PIPE-JOINING METHOD FOR BUILDING HYDROCARBON PIPELINES, IN PARTICULAR, UNDERWATER PIPELINES

(75) Inventors: Serafino Cittadini Bellini, Ascoli Piceno (IT); Valerio Bregonzio, San Giuliano Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 13/980,630

(22) PCT Filed: Jan. 20, 2012

(86) PCT No.: PCT/IB2012/050285
§ 371 (c)(1),
(2), (4) Date: Oct. 7, 2013

(87) PCT Pub. No.: WO2012/098528
PCT Pub. Date: Jul. 26, 2012

(65) Prior Publication Data
US 2014/0034216 A1 Feb. 6, 2014

(30) Foreign Application Priority Data
Jan. 20, 2011 (IT) .............................. MI2011A0053

(51) Int. Cl.
*F16L 13/00* (2006.01)
(52) U.S. Cl.
CPC .................................... *F16L 13/00* (2013.01)
(58) Field of Classification Search
CPC ...................................................... F16L 13/00
(Continued)

(56) References Cited

U.S. PATENT DOCUMENTS 5,565,051 A * 10/1996 Marzola .............. F16L 58/1063
138/99
6,165,302 A * 12/2000 Marzola et al. ................ 156/94
(Continued)

FOREIGN PATENT DOCUMENTS

EP 0366168 A1 * 5/1990 ............. B05D 7/148
EP 1 384 931 A1 1/2004
(Continued)

OTHER PUBLICATIONS https://www.thefreelibrary.com/Buyer%27s+guide+to+thermoplastics.-a0138996656. (Year: 2005).*
(Continued)

*Primary Examiner* — Jeffry H Aftergut
*Assistant Examiner* — Jaeyun Lee
(74) *Attorney, Agent, or Firm* — Sterne, Kessler, Goldstein & Fox P.L.L.C.

(57) ABSTRACT

A pipe-joining method for building a hydrocarbon pipeline, in particular an underwater pipeline, includes welding two adjacent pipes to form a cutback, and forming a protective coating about the cutback. Forming the protective coating includes applying an LE (liquid epoxy) resin or a powdered FBE (fusion bonded epoxy) resin to the cutback to form a primer coat; and applying a powdered polypropylene adhesive on top of the still-wet primer coat to form an auxiliary adhesive coat. Forming the protective coating also includes fitting a polypropylene heat-shrink sleeve around the auxiliary adhesive coat; and heating the sleeve to shrink and bond the sleeve to the auxiliary adhesive coat.

23 Claims, 2 Drawing Sheets

(58) Field of Classification Search
USPC .......................................................... 156/86
See application file for complete search history.

(56) References Cited

U.S. PATENT DOCUMENTS

| | | | |
|---|---|---|---|
| 6,846,176 B2* | 1/2005 | Brown et al. .................. | 432/226 |
| 2007/0240816 A1* | 10/2007 | Nestegard et al. ......... | 156/304.1 |
| 2010/0055327 A1* | 3/2010 | Gaillard et al. .............. | 427/290 |
| 2010/0065614 A1 | 3/2010 | Cittadini Bellini | |
| 2011/0259509 A1* | 10/2011 | Pirie ....................... | B29C 63/14 |
| | | | 156/187 |
| 2011/0297316 A1* | 12/2011 | Jackson et al. ............... | 156/330 |

FOREIGN PATENT DOCUMENTS

| | | | | |
|---|---|---|---|---|
| FR | 2 723 006 A1 | 2/1996 | | |
| WO | WO 9203234 A1 * | 3/1992 | ............ | B05D 7/148 |
| WO | WO 01/87584 A1 | 11/2001 | | |
| WO | WO 2009/027686 A1 | 3/2009 | | |
| WO | WO 2010/130345 A1 | 11/2010 | | |

OTHER PUBLICATIONS https://www.lyondellbasell.com/globalassets/documents/polymers-technical-literature/hifax-epr-60-m-bianco-polypropylene-powder-used-for-field-joint-applications-at-ultra-high-temperatures.pdf for EPR60 (Year: 2016).*
https://www.lyondellbasell.com/globalassets/documents/polymers-technical-literature/hifax-epr-60-m-bianco-polypropylene-powder-used-for-field-joint-applications-at-high-temperatures.pdf for (EP5 10/60) (Year: 2016).*
https://www.lyondellbasell.com/en/polymers/p/Hifax-EP5-10-60M-BIANCO/844efed0-47ae-445f-b1ad-51d84e3f243f (Year: 2016).*
International Search Report and Written Opinion for International Appl. No. PCT/IB2012/050285, European Patent Office, The Netherlands, dated May 16, 2012, 10 pages.
International Preliminary Report on Patentability for International Appl. No. PCT/IB2012/050285, European Patent Office, Munich, dated Apr. 15, 2013, 8 pages.
Written Opinion of International Preliminary Examining Authority for International Appl. No. PCT/IB2012/050285, European Patent Office, Munich, dated Jan. 20, 2013, 8 pages.

* cited by examiner

PIPE-JOINING METHOD FOR BUILDING HYDROCARBON PIPELINES, IN PARTICULAR, UNDERWATER PIPELINES

TECHNICAL FIELD

The present invention relates to a pipe-joining method for building a pipeline, in particular an underwater hydrocarbon (oil, gas, etc.) pipeline.

More specifically, the invention relates to a pipe-joining method for building a pipeline, whereby, after welding the facing free ends of two adjacent, aligned pipes to form an annular joint portion, a protective polymer coating is formed about the annular joint portion.

BACKGROUND ART

Hydrocarbon pipelines, including those underwater, are built by joining pipe sections, each of which normally comprises a metal, normally steel, cylinder, to which are applied a protective polymer coating to protect the metal cylinder, and an optional outer covering of Gunite or cement to weigh the pipeline down.

The opposite free ends of each pipe are left bare to weld the steel cylinders to one another.

Joining he pipes, which may be carried out on land or (in the case of underwater pipelines) on laying vessels, comprises welding the steel cylinders, normally in a number of weld passes; and completing the protective polymer coating and the outer covering (if any). Once each two steel cylinders are welded, a bare annular joint portion (known as and hereinafter referred to as a "cutback"), defined substantially by the free ends of the pipes, extends astride the weld and axially between two end portions of the protective polymer coating, and must in turn be coated with a protective coating.

Applying the protective coating to the cutback is known as "Field Joint Coating", and the cutback is normally coated with a number of coats of appropriate polymer material.

The most widely used methods normally apply three polymer coats:
  a relatively thin first or primer coat applied directly on the cutback;
  a relatively thin second coat of polymer adhesive, applied on top of the first coat; and
  a relatively thick third or top coat (thicker, at any rate, than the first and second coats) applied on top of the adhesive coat.

The outer covering, if there is one, is then also completed.

The two main methods currently adopted to apply three-coat protecting coatings of the above type are:
  1) to apply the three coats separately, one after another;
  2) to apply the first coat (primer), and then a heat-shrink sleeve comprising two layers corresponding to the second and third coats.

More specifically, the first method substantially comprises:
  applying, e.g. spraying, the first coat (primer)—normally of powdered FBE (fusion bonded epoxy) resin—directly onto the cutback heated, e.g. induction heated, beforehand to a temperature of 200-250° C.;
  applying, e.g. spraying, the second (adhesive) Coat—normally of polypropylene adhesive (modified propylene polymer or copolymer)—on top of the first coat; and
  applying the third (top) coat of polypropylene (possibly modified) on top of the adhesive coat, e.g. using a hot spray gun capable of melting and applying the polymer, or by injecting the liquid polymer into a mold around the cutback.

Other known ways of applying the third coat include:
  so-called "cigarette wrapping", whereby thin sheets of polymer material are heated, wrapped and compressed around the cutback, on top of the second coat; and
  so-called "spiral wrapping", whereby a strip of polymer material is heated, wound spirally and compressed around the cutback, on top of the second coat.

The second method, employing heat-shrink sleeves, mainly differs from the first by simultaneously applying the second and third coats, incorporated in the heat-shrink sleeve.

The second method substantially comprises:
  applying the first coat (primer)—in this case, of liquid epoxy (LE) resin;
  fitting a heat-shrink sleeve (HSS) about the primed cutback; the sleeve normally comprises two layers: a protective, heat-shrink outer layer constituting the actual third coat; and an adhesive inner layer constituting the second (adhesive) coat; and
  heating, e.g. flame heating, the sleeve to shrink the outer layer, melt the inner layer, and so bond the sleeve firmly to the first coat (primer) on the cutback.

The above and other substantially similar methods of applying the protective coating leave room for improvement, especially in terms of easy, versatile, effective application, and performance of the finished coating, particularly in terms of mechanical strength and peeling.

Protective coatings formed using known methods, in fact, have proved far from satisfactory.

On the one hand, liquid epoxy (LE) resin primers have generally proved inferior to fusion bond epoxy (FBE) resin primers, which adhere better to the metal substrate, are more resistant to cathode detachment, and have good high-temperature stability and resistance.

On the other hand, commonly used FBE resins are poorly compatible, and therefore complicated to use, with currently available heat-shrink systems.

In other words, there is currently no versatile method, which can be used in various applications with various marketed systems, which is simple and effective, and which provides for fully satisfactory protective coatings.

DISCLOSURE OF INVENTION

It is an object of the present invention to provide a pipe-joining method, for building a hydrocarbon pipeline, e.g. an underwater pipeline, which comprises a protective polymer coating application technique designed to eliminate the drawbacks of the known art.

According to the present invention, there is provided a pipe-joining method, for building a hydrocarbon pipeline, in particular an underwater pipeline, as claimed in the attached Claim 1 and dependent Claims.

The method according to the invention is simple, effective and highly versatile, and can be implemented using easily procurable commercial products.

Moreover, it provides for producing fully satisfactory protective coatings, especially in terms of mechanical strength and peeling.

In fact, peeling tests, conducted on coatings in accordance with the invention (i.e. comprising an auxiliary adhesive coat of powdered polypropylene adhesive) and, by way of comparison, on structurally similar conventional coatings with no auxiliary adhesive coat of powdered polypropylene adhesive, show that, whereas conventional coatings (with no auxiliary adhesive coat of powdered polypropylene adhesive) only barely meet the industry's normal minimum peeling standard, coatings according to the invention amply exceed the minimum standard, even reaching twice or three times minimum standard values.

Testing was performed using, as powdered polypropylene adhesive, what is commonly classified as "Chemically Modified Polypropylene Grafted Adhesive", and more specifically:
  a high-temperature chemically modified polypropylene grafted adhesive with a roughly −20° C. to 140° C. service temperature (temperature at which it remains effective as adhesive), and applied to roughly 200-600 micron thickness within the gelation time of the underlying primer (one such commercial product is Hifax EPR 60/M Bianco);
  a chemically modified polypropylene grafted adhesive with a roughly −20° C. to 120° C. service temperature, and applied to roughly 200-600 micron thickness within the gelation time of the underlying primer (e.g. Hifax EP5 10/60 M Bianco).

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
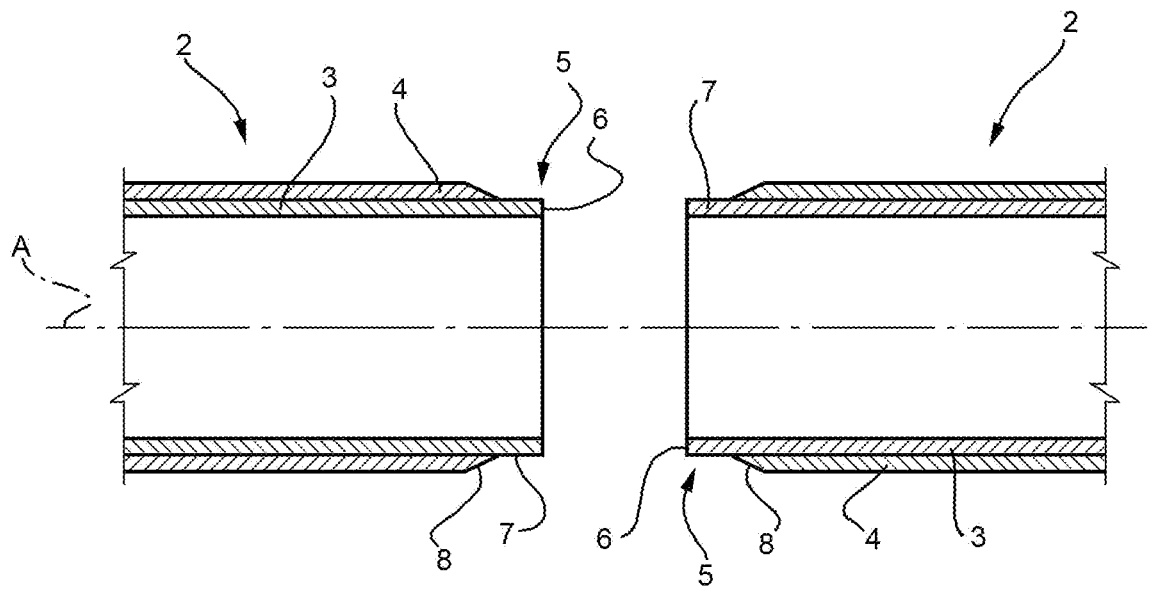
FIG. 1 shows a partial schematic longitudinal section, not to scale, of two pipes to be joined.

FIG. 1 shows two pipes 2 to be joined to form a hydrocarbon pipeline, such as, but not necessarily, an underwater pipeline. For the sake of simplicity, only respective end portions of pipes 2 are shown.

Pipes 2, when ready for joining, extend along an axis A, and each comprise a metal, i.e. steel, cylinder 3; and a protective, e.g. polyethylene or polypropylene, coating 4 applied to and for corrosion-proofing cylinder 3. Pipe 2 may also comprise an optional, e.g. Gunite or cement, outer covering (not shown for the sake of simplicity) on top of protective coating 4, to weigh the pipeline down.

Each pipe 2 has two axially opposite ends 5 (only one shown in FIG. 1) with respective annular (circular) front edges 6; and two end portions 7, which are located at respective ends 5, have no coating 4 (and, in this case, no outer covering), and each extend between an edge 6 and an optionally beveled end portion 8 of coating 4.

Figure 2:
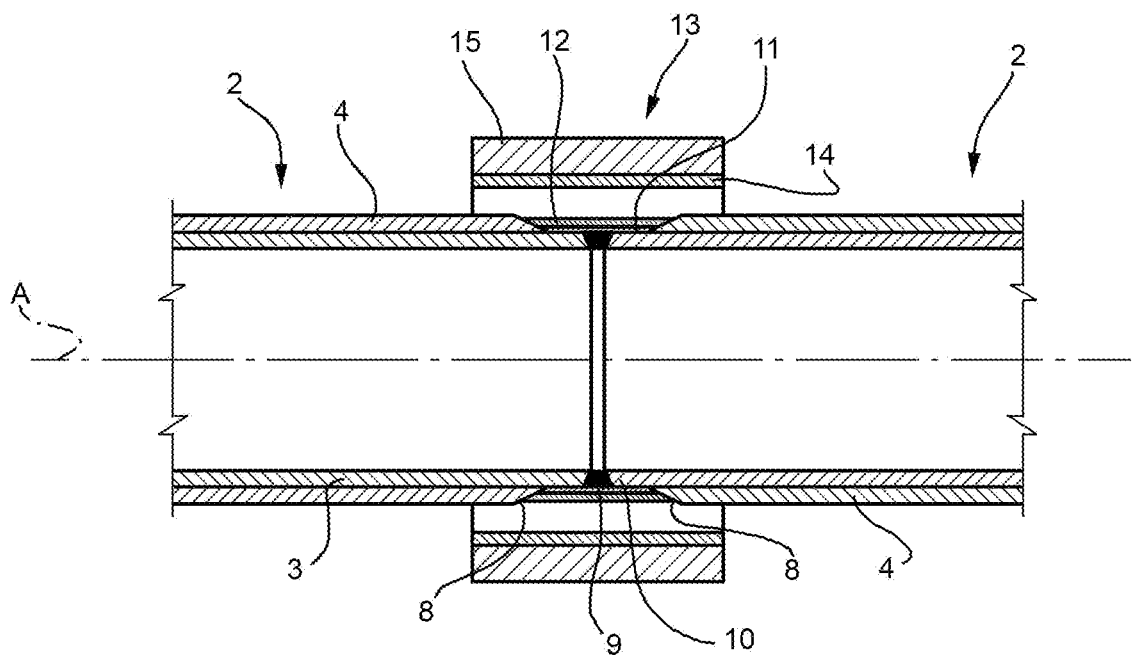
FIGS. 2 and 3 show schematic longitudinal sections, with details not to scale, of the FIG. 1 pipes at various stages in the joining method according to the invention.

The two pipes 2 to be joined are aligned along axis A, with their edges 6 facing parallel and close together, and are welded (i.e. metal cylinders 3 are welded), possibly in a number of passes, to form an annular weld bead 9 between pipes 2, as shown in FIG. 2.

With reference to FIG. 2, the two welded pipes 2 form a cutback 10 extending along axis A, between two end portions 8 of coating 4, and along annular weld bead 9.

Joining pipes 2 comprises completing coating 4, after welding cylinders 3.

After possibly surface treating cutback 10, protective coating 4 is completed by successively applying a number of polymer coats.

A first embodiment of the method according to the invention comprises the steps of:
  Applying a non- or partly polymerized-crosslinked liquid epoxy (LE) resin directly onto the surface of cutback 10 to form a first polymer or primer coat 11. The LE resin is applied in liquid form, e.g. sponged on by hand, or using other suitable methods. The surface of cutback 10 may optionally be preheated, e.g. induction heated in an induction clamp, to facilitate application of the LE resin (which, normally being of relatively high viscosity, becomes more fluid when applied to a heated surface). In which case, before or when applying the LE resin, the method also comprises a preheating, fluidifying step, in which cutback 10 is heated to a temperature below that initiating polymerization-crosslinking of the LE resin.
  Coating cutback 10—on top of the still-wet primer coat 11 (here and hereinafter "wet" is intended to mean a coat in which the resin is still at least partly liquid)—with a powdered polypropylene (polymer or copolymer) adhesive, also non- or partly polymerized-crosslinked, to form an auxiliary adhesive coat 12. The term "polypropylene adhesive" is intended to mean a propylene-based adhesive polymer or copolymer, and in particular a chemically modified polypropylene grafted adhesive. Examples of suitable polypropylene adhesives are the LyondellBasell Industries "Hifax" range of products, preferably with a roughly −20° C. to 120° C. or 140° C. service temperature (the temperature at which it remains effective as an adhesive). Particularly suitable are Hifax EP5 10/60M Bianco, Hifax EPR 60/M Bianco, or similar. The polypropylene adhesive may be applied, for example, using an electrostatic spray gun or other suitable powder application techniques; and the thickness of auxiliary adhesive coat 12 ranges roughly between 200 and 600 microns.
  Heating primer coat 11 and auxiliary adhesive coat 12, e.g. by induction heating cutback 10, to a high enough temperature to polymerize-crosslink the LE resin and polypropylene adhesive. This polymerizing heating step may be performed in various ways. It may, for example, be started before, and continued after, applying the primer and/or polypropylene adhesive; it may be performed at least partly when applying the primer and/or polypropylene adhesive (e.g. in an induction clamp with internal applicators for the primer and/or polypropylene adhesive); or it may be performed in stages, alternating with application of the primer and/or adhesive, etc.
  Fitting a heat-shrink sleeve (HSS) 13 about cutback 10. Sleeve 13 is a two-layer polypropylene sleeve, e.g. a commercial Canusa or Berry Plastics sleeve, comprising an adhesive inner layer 14 of polypropylene adhesive, and a polypropylene heat-shrink outer layer 15.
  Heating, e.g. flame or infrared radiation heating, sleeve 13 to shrink outer layer 15 and melt inner layer 14. Inner layer 14 forms an adhesive coat 17
  (FIG. 3) on top of auxiliary adhesive coat 12, and outer layer 15 forms a protective coat 18 on top of coat 17.

The powdered polypropylene adhesive used for auxiliary adhesive coat 12 is the same type as and/or chemically compatible with the polypropylene adhesive of adhesive inner layer 14 of sleeve 13.

More specifically, the polypropylene adhesive used for auxiliary adhesive coat 12 is the same as that of adhesive inner layer 14 of sleeve 13, but in powdered form.

Auxiliary adhesive coat 12 thus provides for firm, long-lasting, reliable adhesion of heat-shrink sleeve 13 to the primer coat, and therefore to metal cylinder 3, to obtain a protective coating 20 of superior performance, even at high service temperature, and comprising, as a whole, primer coat 11, auxiliary adhesive coat 12, adhesive coat 17, and protective coat 18.

Figure 3:
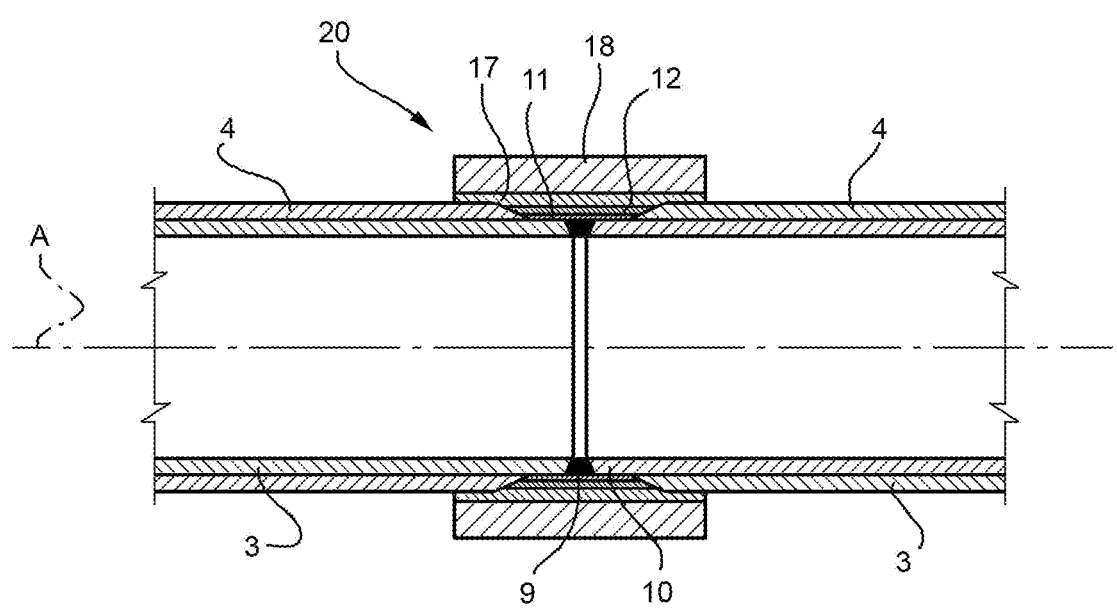

With reference to FIGS. 2 and 3, a second embodiment of the method according to the invention comprises the steps of:

Applying a non- or partly polymerized-crosslinked FBE (fusion bonded epoxy) resin powder directly onto the surface of cutback 10 to form primer coat 11 (the first coat of protective coating 20). The FBE resin may be applied, for example, using an electrostatic hot spray gun capable of melting and applying the polymer.

Heating primer coat 11, e.g. by induction clamp heating cutback 10, to a high enough temperature to polymerize-crosslink the FBE resin. This polymerizing heating step may be performed in various ways, and advantageously comprises a step of preheating cutback 10, before and/or when applying the FBE resin, to a first temperature at which the FBE resin is substantially liquid and begins polymerizing; and a step of heating cutback 10, after the FBE resin is applied, to a second temperature higher than the first.

Coating cutback 10—on top of the still-wet primer coat 11 (FBE resin still at least partly liquid) with the powdered polypropylene (polymer or copolymer)—adhesive, and in the same way as, described above, to form auxiliary adhesive coat 12. The temperature reached to apply and polymerize-crosslink the FBE resin is normally also high enough to apply and polymerize-crosslink the powdered polypropylene adhesive, so further heating is not required. The temperature may still be monitored, however, and, if it falls below a given threshold, may be increased by further heating to the temperature required to polymerize-crosslink the polypropylene adhesive.

Fitting heat-shrink sleeve (HSS) 13 about cutback 10, as described above. Sleeve 13 is a two-layer sleeve of the type described above, and so comprises an adhesive inner layer 14 of polypropylene adhesive, and a protective polypropylene heat-shrink outer layer 15.

Heating, e.g. flame or infrared radiation heating, sleeve 13 to shrink the polypropylene heat-shrink outer layer 15 and melt inner layer 14 to form—on cutback 10, on top of primer coat 11 and auxiliary adhesive coat 12 (FIG. 3)—adhesive coat 17 topped with protective coat 18.

As shown in FIGS. 2 and 3, a third embodiment of the method according to the invention comprises the steps of:

Applying the powdered FBE resin directly onto the surface of cutback 10 (as in the second embodiment) to form primer coat 11. In this case, too, applying the FBE resin comprises heating primer coat 11, which may be done, possibly in stages, before, when and/or after applying the FBE resin. As in the second embodiment, the FBE resin is best applied to a preheated surface of cutback 10, so the method according to the invention preferably also comprises a step of preheating cutback 10, before and/or when applying the FBE resin, to a first temperature at which the FBE resin is substantially liquid and begins polymerizing; and a step of heating cutback 10, after applying the FBE resin, to a second temperature higher than the first.

Coating cutback 10—on top of the still-wet primer coat 11 (FBE resin still at least partly liquid)—with the polypropylene (polymer or copolymer) adhesive, to form auxiliary adhesive layer 12, as described in the first and second embodiments. In this case, too, the temperature reached to apply and polymerize-crosslink the FBE resin is also high enough to apply and polymerize-crosslink the powdered polypropylene adhesive, so further heating is not required. As stated above, however, further heating may be performed, if necessary, so the method according to the invention generally also comprises a step of heating primer coat 11 and auxiliary adhesive coat 12 in any of various ways.

Fitting a heat-shrink sleeve 13 about cutback 10. The sleeve may be either a two-layer sleeve as described above (i.e. comprising an adhesive inner layer 14 of polypropylene adhesive, and a protective polypropylene heat-shrink outer layer 15), or a single-layer sleeve only comprising a polypropylene heat-shrink layer 15 (i.e. without the FIG. 2 layer 14).

Heating, e.g. flame or infrared radiation heating, sleeve 13 to shrink the polypropylene heat-shrink outer layer 15 and melt the adhesive inner layer 14 (if any) to form protective coat 18, and possibly adhesive coat 17, on top of primer coat 11 and auxiliary adhesive coat 12 on cutback 10 (FIG. 3).

When using a single-layer sleeve 13 only comprising polypropylene heat-shrink layer 15, the powdered polypropylene adhesive used for auxiliary adhesive coat 12 is chemically compatible with the polypropylene material of sleeve 13.

In all the embodiments, the outer covering is completed, if necessary, with a bitumen or resin coating (not shown).

Clearly, changes may be made to the method as described and illustrated herein without, however, departing from the scope of the accompanying Claims.

The invention claimed is:

1. A pipe-joining method for building a hydrocarbon pipeline, the method comprising the steps of:
   welding two adjacent, aligned pipes to form a cutback; and
   forming a protective coating around the cutback, the step of forming the protective coating comprising the steps of:
      applying a polymer primer coat and an auxiliary adhesive coat, comprising the steps of:
         applying a primer consisting essentially of one of (i) a liquid epoxy resin or (ii) a powdered fusion bonded epoxy resin to a surface of the cutback to form the polymer primer coat; and
         applying a powdered polypropylene adhesive on top of the primer coat, while the primer coat is still wet, to form an auxiliary adhesive coat; and
      applying a polypropylene heat-shrink sleeve, comprising the steps of:
         fitting the sleeve around the auxiliary adhesive coat; and
         heating the sleeve to shrink and bond the sleeve to the auxiliary adhesive coat,
      wherein the sleeve comprises an adhesive inner layer of polypropylene adhesive; and
      wherein the powdered polypropylene adhesive used for the auxiliary adhesive coat is chemically compatible with the polypropylene adhesive of the adhesive inner layer of the sleeve.

2. The method as claimed in claim 1, wherein the powdered polypropylene adhesive used for the auxiliary adhesive coat is the same polypropylene adhesive as the adhesive inner layer of the sleeve, but in powdered form.

3. The method as claimed in claim 1, wherein the sleeve is a two-layer polypropylene sleeve comprising the adhesive inner layer of polypropylene adhesive and a polypropylene heat-shrink outer layer.

4. A pipe-joining method for building a hydrocarbon pipeline, the method comprising the steps of:
welding two adjacent, aligned pipes to form a cutback; and
forming a protective coating around the cutback, the step of forming the protective coating comprising the steps of:
applying a polymer primer coat and an auxiliary adhesive coat, comprising the steps of:
applying a primer consisting essentially of one of (i) a liquid epoxy resin or (ii) a powdered fusion bonded epoxy resin to a surface of the cutback to form the polymer primer coat; and
applying a powdered polypropylene adhesive on top of the primer coat, while the primer coat is still wet, to form an auxiliary adhesive coat; and
applying a polypropylene heat-shrink sleeve, comprising the steps of:
fitting the sleeve around the auxiliary adhesive coat; and
heating the sleeve to shrink and bond the sleeve to the auxiliary adhesive coat,
wherein the sleeve is a single-layer polypropylene sleeve comprising a single heat-shrink polypropylene layer chemically compatible with the powdered chemically modified polypropylene grafted adhesive used for the auxiliary adhesive coat.

5. The method as claimed in claim 1, wherein the powdered polypropylene adhesive is applied using an electrostatic spray gun.

6. The method as claimed in claim 1, wherein applying the polymer primer coat and the auxiliary adhesive coat further comprises at least one heating step to heat the primer coat and the auxiliary adhesive coat to a high enough temperature to polymerize-crosslink the primer coat and the auxiliary adhesive coat.

7. The method as claimed in claim 6,
wherein the primer coat consists essentially of the liquid epoxy resin; and
wherein applying the polymer primer coat and the auxiliary adhesive coat further comprises, before or simultaneously with applying the primer, a fluidifying heating step comprising heating the cutback to a temperature below the polymerization-crosslinking temperature of the primer to fluidify the primer and so facilitate application of the primer.

8. The method as claimed in claim 6,
wherein the primer consists essentially of the powdered fusion bonded epoxy resin; and
wherein applying the polymer primer coat and the auxiliary adhesive coat further comprises:
a first heating step comprising heating the cutback to a first temperature, before or simultaneously with applying the primer; and
a second heating step comprising heating the cutback to a second temperature higher than the first temperature after applying the primer.

9. The method as claimed in claim 8, wherein the second temperature is high enough to also apply and polymerize-crosslink the powdered polypropylene adhesive of the auxiliary adhesive coat.

10. The method as claimed in claim 1, wherein the hydrocarbon pipeline is an underwater pipeline.

11. The method as claimed in claim 1 wherein the powdered polypropylene adhesive has a thickness in a range from 200 microns to 600 microns.

12. The method as claimed in claim 8, wherein the first temperature is high enough to substantially fluidify the fusion bonded epoxy and to begin polymerization of the fusion bonded epoxy.

13. The method as claimed in claim 6, wherein the primer consists essentially of the liquid epoxy resin.

14. The method as claimed in claim 13, wherein applying the polymer primer coat and the auxiliary adhesive coat further comprises heating the cutback to a temperature below the polymerization-crosslinking temperature of the primer to fluidify the primer and so facilitate application of the primer.

15. The method as claimed in claim 14, wherein the step of applying the primer to the surface of the cutback to form the polymer primer coat and the step of heating the cutback to the temperature below the polymerization-crosslinking temperature of the primer to fluidify the primer and so facilitate application of the primer occurs in alternating stages.

16. The method as claimed in claim 6, wherein applying the polymer primer coat and the auxiliary adhesive coat further comprises:
monitoring the temperature of the primer coat and the auxiliary adhesive coat; and
further heating the primer coat and the auxiliary adhesive coat to the temperature to polymerize-crosslink the primer coat and the auxiliary adhesive coat when the temperature falls below a threshold.

17. A pipe-joining method for building a hydrocarbon pipeline, the method comprising the steps of:
welding two adjacent, aligned pipes to form a cutback; and
forming a protective coating around the cutback, the step of forming the protective coating comprising the steps of:
applying a polymer primer coat and an auxiliary adhesive coat, comprising the steps of:
applying a primer consisting essentially of one of (i) a liquid epoxy resin or (ii) a powdered fusion bonded epoxy resin to a surface of the cutback to form a polymer primer coat;
heating, before or simultaneously with applying the primer to the surface of the cutback, the cutback to a temperature below the polymerization-crosslinking temperature of the primer to fluidify the primer and so facilitate application of the primer;
applying a powdered polypropylene adhesive on top of the primer coat, while the primer coat is still wet, to form an auxiliary adhesive coat; and
heating the primer coat and the auxiliary adhesive coat to a high enough temperature to polymerize-crosslink the primer coat and the auxiliary adhesive coat; and
applying a polypropylene heat-shrink sleeve, comprising the steps of:
fitting the sleeve around the auxiliary adhesive coat; and
heating the sleeve to shrink and bond the sleeve to the auxiliary adhesive coat,
wherein the sleeve comprises an adhesive inner layer of polypropylene adhesive; and wherein the powdered polypropylene adhesive used for the auxiliary adhesive coat is chemically compatible with the polypropylene adhesive of the adhesive inner layer of the sleeve.

18. The method as claimed in claim 1, wherein the powdered polypropylene adhesive consists essentially of a chemically modified polypropylene grafted adhesive.

19. The method as claimed in claim 4, wherein the powdered polypropylene adhesive consists essentially of a chemically modified polypropylene grafted adhesive.

20. The method as claimed in claim 17, wherein the powdered polypropylene adhesive consists essentially of a chemically modified polypropylene grafted adhesive.

21. The method as claimed in claim 1, wherein the powdered polypropylene adhesive has a service temperature ranging from −20° C. to 120° C.

22. The method as claimed in claim 4, wherein the powdered polypropylene adhesive has a service temperature ranging from −20° C. to 120° C.

23. The method as claimed in claim 17, wherein the powdered polypropylene adhesive has a service temperature ranging from −20° C. to 120° C.

\* \* \* \* \*

UNITED STATES PATENT AND TRADEMARK OFFICE
CERTIFICATE OF CORRECTION

PATENT NO.        : 10,527,206 B2
APPLICATION NO.   : 13/980630
DATED             : January 7, 2020
INVENTOR(S)       : Cittadini Bellini et al.

Page 1 of 1

It is certified that error appears in the above-identified patent and that said Letters Patent is hereby corrected as shown below:

On the Title Page

Item (30), Foreign Application Priority Data Section, Line 1, "MI2011A0053" should be --MI2011A000053--.

Signed and Sealed this
Twenty-fourth Day of March, 2020

Andrei Iancu
*Director of the United States Patent and Trademark Office*